United States Patent [19]

Kennedy

[11] 4,022,992
[45] May 10, 1977

[54] PHONE GUARD FOR LOCKING OUT LONG-DISTANCE CALLS

[76] Inventor: Austin R. Q. Kennedy, Sanford Station, 3751 W. 6th St., Los Angeles, Calif. 90005

[22] Filed: May 21, 1976

[21] Appl. No.: 688,922

[52] U.S. Cl. .......................... 179/189 D; 179/90 D
[51] Int. Cl.² ........................................ H04M 1/66
[58] Field of Search .......... 179/189 D, 189 R, 90 D

[56] References Cited

UNITED STATES PATENTS

| | | | |
|---|---|---|---|
| 3,511,939 | 5/1970 | Aikawa | 179/90 D |
| 3,727,009 | 4/1973 | Ireland | 179/90 D |
| 3,748,402 | 7/1973 | Yussen | 179/90 D |
| 3,832,497 | 8/1974 | Vogt | 179/90 D |

*Primary Examiner*—Thomas W. Brown
*Attorney, Agent, or Firm*—Erwin S. Teltscher

[57] ABSTRACT

A telephone lock for attachment to a telephone permits a user to dial local calls only with a first predetermined number of digits, where one of the digits is assigned to call an operator. The telephone receiver normally rests upon a set of depressable push-buttons for making contact with the push-buttons of the telephone itself. A lock dialing device is connected to the telephone's dialing device so that a user can dial a selected number of the digits sequentially when the telephone speaker and receiver have been lifted from the set of push-buttons. First and second dialing stop-devices prevent the user from dialing the digit assigned to the operator, and from dialing an additional number of the digits after he has dialed the first number of digits, respectively. A counting device for counting the first number of digits includes a shaft and a gear rotatable on the latter which is formed with a plurality of substantially equispaced longitudinal fingers, one of the fingers being an elongated finger. A torsion spring urges the gear to move in one direction, and the gear may be advanced one angular step equal to the spacing between adjacent fingers when dialing one of the digits. The second dialing stop-means stops the advancement of the gear when a bar attached to the lock's housing impinges on the elongated finger. When the receiver and speaker have been replaced on the set of push-buttons, the dialing device is reset to an initial state.

7 Claims, 10 Drawing Figures

PHONE GUARD FOR LOCKING OUT LONG-DISTANCE CALLS

BACKGROUND OF THE INVENTION

1. Field of the Invention

The field of the present invention relates to a telephone guard or lock.

2. Description of the Prior Art

A plurality of telephone locks or guards are known, the purpose of which is to prevent a user from making unauthorized calls.

For example there is known a telephone security device which is intended to prevent unauthorized use of the distant-direct-dialing facility on dial type telephones. It makes use of a mechanism which is stepped by operation of the dial to call a digit, and which after a predetermined number of digits has been called, locks the dialing mechanism to prevent further dialing. The predetermined number is so selected as to prevent the desired misuse of the telephone. There is also known an apparatus for preventing the dialing of toll call telephone numbers using a public utility rotary dial telephone. The latter apparatus permits local telephone calls to be completed and can be disabled to permit toll calls by a key operated assembly. The apparatus can also be converted into a local call pay telephone. There is additionally known a telephone long distance attachment for attaching to a standard telephone on the outside housing thereof, without in any way dismantling the telephone, for preventing long distance calls and at the same time facilitating local calls in which a first ratchet mechanism limits the number of dialed digits to those required for a local call only, a second ratchet mechanism prevents dialing the operator on the first dial, and a third ratchet mechanism prevents the release of the telephone buttons before they are fully pressed to prevent dialing by depressing the buttons. There is further known a pay phone for local calls only which has a counter mechanism associated with the dial to sense prohibited digits (e.g., "1" or "0") in specific positions within a telephone number and to disable the phone when a toll call is attempted; a key operated switch overrides the disabling circuit to permit keyholders to make unlimited calls.

SUMMARY OF THE INVENTION

All of the above-described devices are relatively complex and/or costly.

It is accordingly an object of my present invention to devise a relatively inexpensive phone guard or phone lock which permits the user to make low-cost local calls, but prevents him from making costly long-distance calls either by dialing such calls directly or through placing them by an operator.

I accordingly provide a telephone lock to be attached to a telephone and where the telephone has first dialing means for dialing a multiplicity of dialable digits and an operative hand-held receiver and speaker which can be placed on a first set of depressable push-buttons for enabling a user to dial local calls only, and wherein the local calls may be dialed with a first predetermined number of digits. The telephone lock is provided with a second set of depressable push-buttons for the receiver to rest on, and for making contact with the first set of push-buttons, respectively, upon the receiver being inoperative. A second dialing means, which has an initial state, is connected to the first dialing means for enabling a user to dial a selected number of the dialable digits sequentially when the receiver and speaker is lifted from the second set of push-buttons; the selected number of dialable digits is then equal to the first plurality of digits. Counting means are provided for counting the first predetermined number of digits and long-distance dialing stop-means are provided for preventing the user from dialing an additional number of the digits when the first plurality of digits have been dialed and counted by the counting means. Resetting means are provided for resetting the dialing means to the initial state when the receiver and speaker has been replaced on the second set of push-buttons.

At least one of the digits is assigned for calling an operator and operator-dialing stop-means are provided for preventing a user from dialing at least one of the digits on the dialing means on at least an initial dialing; the user is thereby prevented from reaching the operator and verbally placing a long-distance call through the operator.

The telephone lock includes a housing, and the counting means includes a shaft, a gear rotatable on the latter and formed with a plurality of substantially equally spaced longitudinal fingers, the plurality of fingers is numerically equal to the first number plus one, and one of the fingers is an elongated finger exceeding the remaining fingers in length. A torsion spring is attached with one of its ends to the shaft, and with the other end to the gear for urging the latter to move in one direction; the gear is advanced one angular step equal to the spacing between adjacent fingers upon the dialing of one of the digits. The torsion spring is stepwise windable by the dialing of one of the digits and the dialing stop-means includes a bar attached to the housing for stopping the advancement of the gear when the bar impinging upon the elongated finger and upon the gear has been rotated by a plurality of steps, which plurality of steps is numerically equal to the first number. The counting means includes ratchet means cooperating with the gear for preventing the latter from rotating in the direction urged by the torsion spring during digit dialing; the gear can be displaced by the resetting means from a position cooperating with the ratchet to a position disengaged therefrom; the torsion spring then returns the gear to the initial state. The telephone lock includes lock-means having locked and unlocked positions for locking and unlocking the housing to and from the telephone, respectively. The long-distance calls and the local calls only are dialable from the lock-attached telephone in the unlocked and locked positions, respectively. Since the operator may be called initially by dialing the digit zero, the operator-dialing stop-means includes zero-dialing stop-means which have an initial position for preventing dialing of the digit zero on the initial dialing, and release means for setting the zero-dialing stop-means to an inoperative position. The resetting means includes means for resetting the zero-dialing stop-means from the inoperative position to the initial position.

In one version of my invention the telephone is a push-button telephone, the second dialing means includes a second set of push-buttons, and the first dialing means includes a first set of push-buttons which may be contacted by a second set of push-buttons, respectively. In another version of my invention the telephone is a rotary-dialed telephone, the second dialing means includes a second dialing disc, and the first dialing means includes a first dialing disc which is actuable by the second dialing disc.

BRIEF DESCRIPTION OF THE DRAWING

My invention will be better understood with reference to the accompanying drawing in which.

DETAILED DESCRIPTION OF THE PREFERRED EMBODIMENTS

Figure 1:
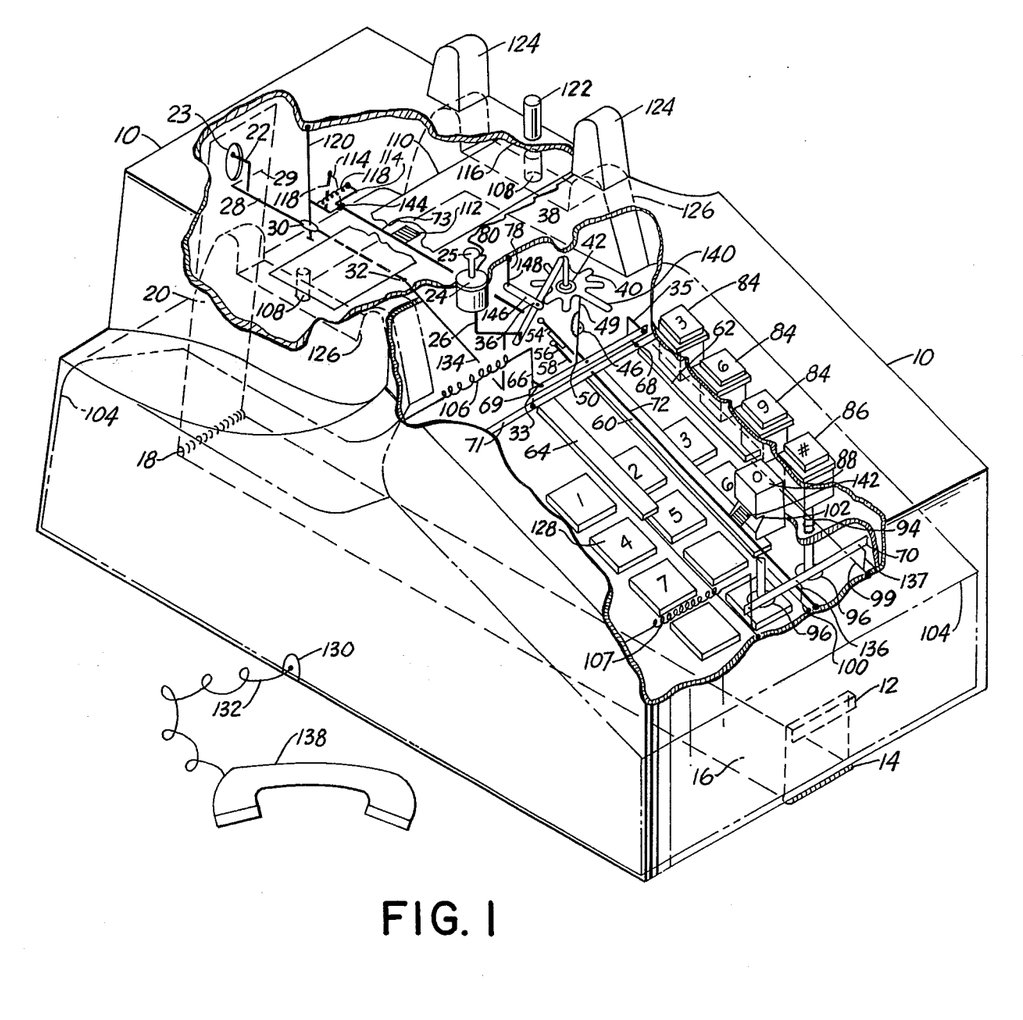
FIG. 1 is a perspective view of a phone lock adapted to be attached to a push-button telephone.

Referring now to FIGS. 1 through 4, the construction and method of operation of the phone lock will be described. Frame 10 of the phone lock is shown in FIG. 1 completely covering the outline of a conventional push-button phone 104 shown by dotted lines. The frame 10 of the phone lock is formed with a front flap or door 12 pivotable about a hinge 14, a bottom flap or door 16 pivotable about a hinge 18, and a rear flap or door 20 also pivotable about the latter hinge. A cord 132 attached to the phone 104 is allowed to pass through slot 130 formed in the frame 10 of the phone lock, and has a receiver-speaker 138 attached thereto. While a lock 24 of the phone lock is in an unlocked position, a hook 29 shown in FIG. 1 engaged with a hook 22, the latter being attached to the rear door 20, and shown protruding through an opening 23 formed in the frame 10, then occupies a non-illustrated position which is spaced from the position shown in a counterclockwise direction by about 20 degrees; the hook 29 is thus disengaged from the hook 22. Only when the hook 29 is disengaged from the hook 22, may the rear flap or door 20 of the frame 10 be opened. When the door 20 is closed, a clockwise motion of a key 25 inserted into the lock 24 rotates an arm 26 rigidly attached thereto clockwise, which in turn causes a lever arm 134 attached to the arm 26 to move in a clockwise direction also. An arm 28 is pivotably attached through a hinge 32 to the lever arm 134, the latter being formed with a slot 30; a supporting rod 120 attached to a top portion of the frame 10 passes through the latter, the hook 29 being rigidly attached to the arm 28 at an end thereof opposite to the end pivotable about the hinge 32. The clockwise motion of the key 25 thus causes the hook 29 to rotate in a clockwise direction also, until it slips under the hook 22, when the flap or door 20 is in the upward or closed position.

The top of frame 10 is formed with four upwardly pointing projections 124, which form a cradle to receive the speaker 138. As will perhaps be best seen in FIG. 4, the top portion of frame 10 is disposed just above four corresponding upwardly pointing projections 126 on the conventional push-button phone, the latter having depressable buttons 108 disposed between respective pairs of projections 126. A guide portion 116 formed with a suitably shaped slot 11 is attached to the underside of the top portion of frame 10 for guiding two depressable push-buttons 122 disposed between respective pairs of projections 124. A plate 110 is rigidly attached to the bottom parts of the push-buttons 122, the plate 110 being arranged to normally rest on the push-buttons 108, so that a depression of push-buttons 122 will also depress push-buttons 108, which will normally occur when the receiver 138 is placed in the cradle formed by the four projections 124 and the top portion of the frame 10. Upon the phone lock having been locked in place by the key 25 in lock 24, it is now ready for operation.

It will be seen that the conventional push-button phone is equipped with push-buttons 128; the phone lock is provided with corresponding push-buttons 84, and at least one specially formed push-button 88 to be described later, which are disposed above the push-buttons 128. Each push-button 84 and 88 is provided with a plunger 94 at its lower extremity, the plunger 94 consisting of a pushrod 93, that passes thru guide hole 92 and a compression spring 90 fitting over the pushrod 93, and a tab end 96 attached to the end of the pushrod 93. A depression of a push-button 84 or 88 will also result in a depression of a corresponding push-button 128. As can perhaps best be seen from FIG. 2. three rods 98, 99 and 100 are pivotably supported at respective ends in a bracket 75 attached to the frame end at the front end thereof, and in a cross-beam 71 disposed approximately at the longitudinal center of the phone lock. Plates 64, 60 and 62 are eccentrially mounted on respective bars or rods 98, 100 and 99. L-shaped rods 135, 136 and 137 are connected to rods 98, 100 and 99 in the vicinity of their respective forward ends, and the aforeside L-shaped rods are pivotably attached to a common plate 70, so that a pivotable movement of any one of the rods 98, 100 or 99 about its respective axis will cause the remaining rods to rotate likewise. Furthermore three sets of at least three push-buttons 84 and 88 are arranged to contact respective plates 64, 60 and 62 off center, causing one of the respective latter plates to rotate upon depression of one of the push-buttons 84 or 88, which will, in turn, rotate the remaining plates by a corresponding angle. The rods 98, 100 and 99 are, furthermore, bent upwards at their other ends and attached through extension rods 33, 34, and 35 respectively to a common plate 69. A normally vertically upwards pointing rod 50 is attached to the center rod 100, the rod 50 being extended in an upward direction by a rod-like tip 49 pivotably attached thereto, but movable only in a clock-wise direction. A tension spring 48 connected to both tip 49 and rod 50 maintains the two latter rods normally in an upright position, the tip 49 thus acting as a ratchet, as will be explained later. Springs 106 and 107 attached with one of their ends to the frame 10, and with the other of their ends to the bars 98 and 135 urge the latter to rotate counterclockwise, the limit of the counterclockwise rotation of the bar 98 being the lower end of at least one of the push-buttons 84 normally in contact with the plate 64 attached to the rod of bar 98.

The arm 26 attached to the lock 24 is approximately S-shaped and is pivotably attached at an end opposite its lock-attached end to a normally horizontal portion of an approximately M-shaped bar 38 which is pivotably connected at a mid-part of its horizontal portion to one end of a normally horizontal bar 146, the other end of the bar 146 being pivotably connected to the lower end of a vertical support-bar 148, while the other end of the bar 148 is rigidly attached to the top portion of the frame 10. The bar 38, which is approximately M-shaped, having the horizontal portion forming one leg of the M, while an adjoining portion forms a shaft for a gear 40 formed with a plurality of fingers, one of the fingers being an elongated finger 140. A torsion spring 42 having two ends is attached with respective ends to the shaft portion of the bar 38 and the gear 40; when the spring 42 is wound up, it urges the gear 40 to rotate in a clockwise direction. When the gear 40, is, however, in the position shown in full lines in FIGS. 1 and 2, it is prevented from rotating clockwise by a bar 78. The latter is pivotable about a horizontal shaft or pin 79 attached to a holder 80, which is an extension of the plate 110. The holder 80, together with attached plate 110 is pivotable about a horizontal shaft 149, being supported thereon through two vertical arms 147 extending downwardly from the top portion of the frame 10, as can best be seen in FIG. 2. The bar 78 acts as a ratchet, since it is prevented from rotating clockwise by a stop pin 77 mounted on the holder 80, but is free to rotate counterclockwise up to one full revolution in the position shown in FIG. 2.

Figure 2:
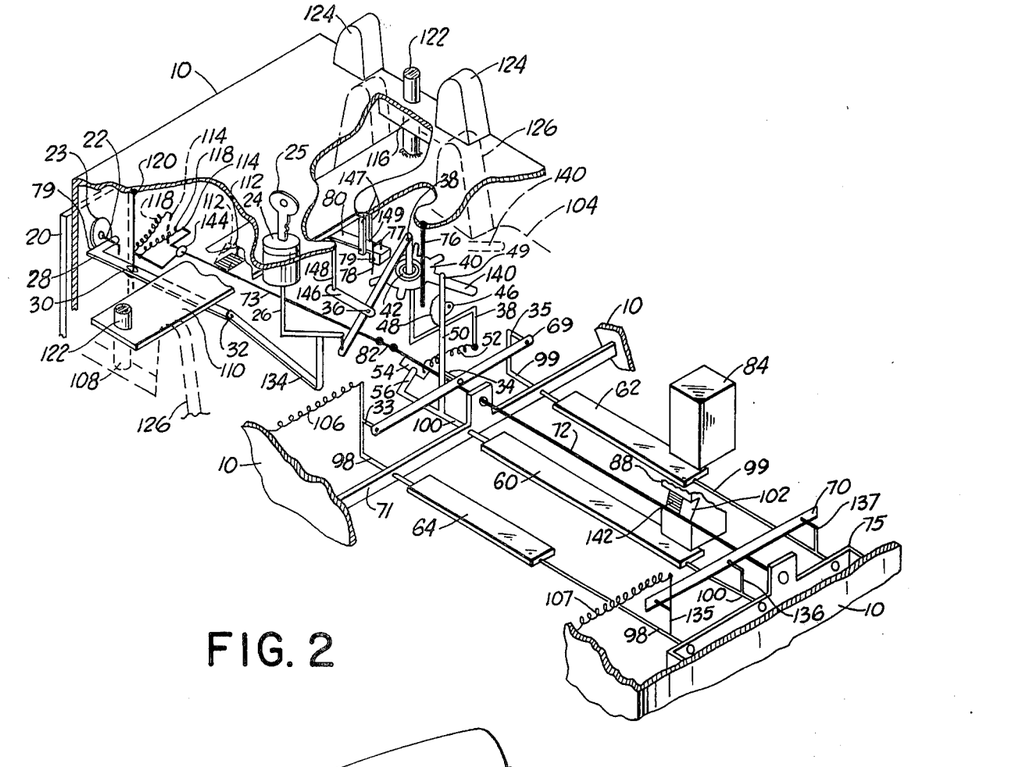
FIG. 2 is a perspective view in partial section of a detail of FIG. 1.
Figure 3:
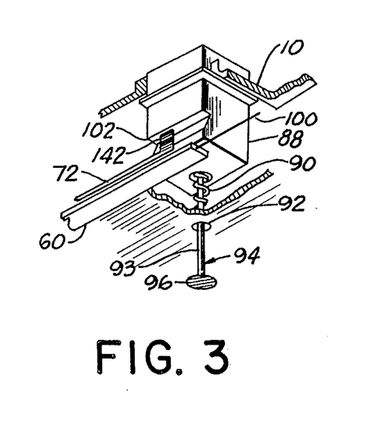
FIG. 3 is a perspective view in partial cross-section of a zero-digit push-button.
Figure 4:
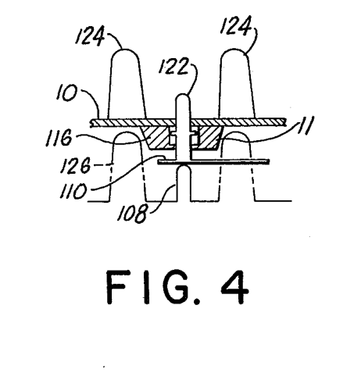
FIG. 4 is a side view in partial cross-section of the depressable push-buttons depressable by a hand-held receiver and speaker.

When one of the push-buttons 84 or 88 is depressed, it thus rotates the gear 40 counterclockwise by one step equivalent to the angular spacing between adjoining fingers of the gear 40; the gear 40 is unable to rotate clockwise as a result of the action of the bar 78 acting as a ratchet. Dialing of 7 digits needed for a local call thus winds up the torsion spring 42. The gear 40 is set so that after the dialing of 7 digits an elongated finger 140 thereof hits a stop bar 76 extending downwardly from the top portion of the frame 10. The number of digits which may be dialed is, of course, determined by the number of fingers protruding from the gear 40, exclusive of the elongated finger 140.

When the receiver 138 is replaced in the cradle of the phone lock, or if push-buttons 122 are depressed, the plate 110 is also depressed, which on the one hand depresses the push-buttons 108 of the conventional push-button phone, and on the other hand causes the forward end of the holder 80, to which the ratched-acting bar 78 is attached, to swing upwards, thus releasing the hold of the latter on the gear 40 and permitting the torsion spring 42 to rotate the gear 40 fully clockwise to its initial position. The phone lock is now ready for another local call, permitting the dialing, for example, of only seven digits.

Long distance calls can be made on a conventional phone by either dialing the area code, normally a three digit number, following by the local subscriber number, normally a seven digit number, and the mechanism described above prevents the dialing of numbers exceeding a preset number of digits, that number of digits being equal to the digits required to make a local call. It is alternately possible, however, to dial the operator, usually by dialing the number zero, and ask the operator to make a long distance call without having to dial the long-distance number which includes the three digit area code.

In order to prevent a user from reaching a long-distance number via the operator, it is necessary to block the operator assigned number, which is usually the digit zero, but may also be a multi-digit number, such as the digits 1, 0 and 0. In what follows a mechanism for blocking the initial dialing of the number zero will be described, although the operation is applicable and extendable to a multi-digit number using the same principles of operation.

As best seen in FIG. 2, a rod 72 is pivotably supported on brackets 75 and bar 71. A tab 142 is attached to the rod 72, also seen in FIG. 3, which fits into a slot 102 of the "zero" button 88. The latter cannot, therefore, be depressed, as long as tab 142 nestles within the slot 102. In the initial position of the phone lock the tab 142 occupies the aforesaid position, so that a user cannot dial the digit zero and therefore reach an operator in order to place a long-distance call verbally.

As soon as a digit other than zero has been dialed as a result of depressing any of the push-buttons 84, a tab 56 attached to the rod 100 rotates clockwise, causing in turn a tab 54 attached to the rod 72 to rotate the latter counterclockwise, which in turn releases the tab 142 from the position it has occupied within the slot 102, so that the zero digit button 88 can now be depressed, and the digit zero dialed as any digit of a normal local number, other than the first digit thereof. Note that a non-functional push-button 86 merely operates a corresponding key 128 by means of the plunger 94 already described. A universal joint 82 is coupled with one end thereof to the rod 72; a rod 73 is attached to the other end of the universal joint 82 and is rotatably attached at a pivot 144 to a bar 120 extending downwardly from the top portion of the frame 10. A bar 114 is attached to the rod 73, extends at right angles thereto, and occupies a horizontal position when the tab 142 is disposed in slot 102 of the push-button 88. When the tab 142 is, however, disposed outside the slot 102, the bar 114 is rotatably displaced to a position shown dotted in FIG. 2, as is tab 112. It is maintained in this displaced position by a spring 118 having two ends, one of the ends of the spring 118 being attached to the rod 114, the other end thereof to the bar 120; the tab 112 will stay in the horizontal position when the receiver-speaker 138 has been lifted from the cradle as long as a first digit — other than the digit zero — has not been dialed. As soon as a first digit other than zero has been dialed, the tab 112 will assume the displaced position shown dotted in FIG. 2. Upon replacement of the receiver-speaker on its cradle, the downward motion of the push-buttons 122, and consequently of the plate 110 will also depress tab 112 from its displaced position to the horizontal position, thus re-inserting tab 142 also within the slot 102.

When it is desired to unlock the phone lock, the key 25 is turned counterclockwise. This causes the arm 38 pivoted thereto and the gear 40 to move clockwise about the pivot 36, moving in turn the bar 146 counterclockwise with respect to the bar 148 projecting in a downward direction from the top portion of the housing 10. The clockwise motion of the bar 38 causes the gear 40 to assume a position at the end of the counterclockwise motion of the key 25, which is symbolically indicated on FIG. 2 by the dotted outlines of the elongated finger 140 of the gear 40; the latter has thus been freed of the constraining action of ratchets 49 and 78, so that the spring 42 turns the gear 40 clockwise to its starting position. Also the lowest extremity of the M-shaped bar 38 has one end of a spring 52 attached thereto, the other end of the spring 52 being attached to the tab 54 attached to rod 72. A counterclockwise unlocking motion of the key 25 thus results in a clockwise motion of the M-shaped bar 38, and in a counterclockwise motion of the tab 54, which in turn releases the tab 142 from the slot 102. The phone lock is now set for long distance as well as local dialing without the need to remove the phone lock from the phone 104; the phone lock is nevertheless, unlocked from the phone 104 since the counterclockwise motion of the key 25 causes arm 134 attached thereto to move likewise, resulting in a counterclockwise motion of the arm 28, and the unhooking thereof from the hook 22.

It will, of course, be appreciated that any other button 84 can be made to duplicate the action of the button 88, so that it is easily possible to prevent a user from reaching an operator if a combination of digits, such as 1, 0, 0, is necessary to reach the operator, rather than the single digit 0.

Figure 5:
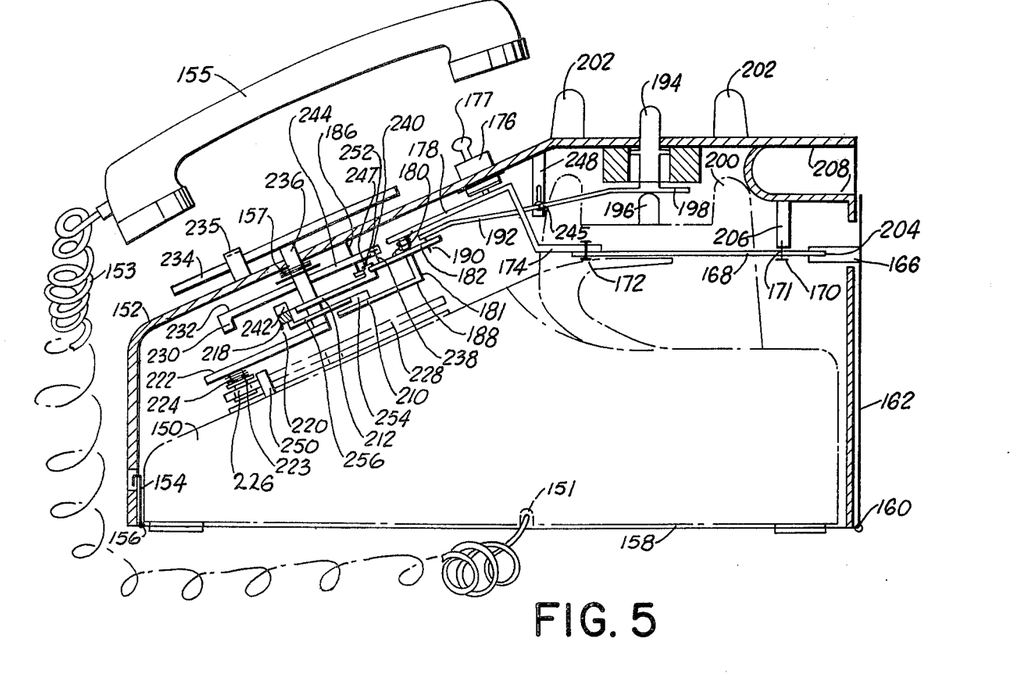
FIG. 5 is a side elevation view of a phone lock adapted for a rotary type telephone in partial cross-section.
Figure 6:
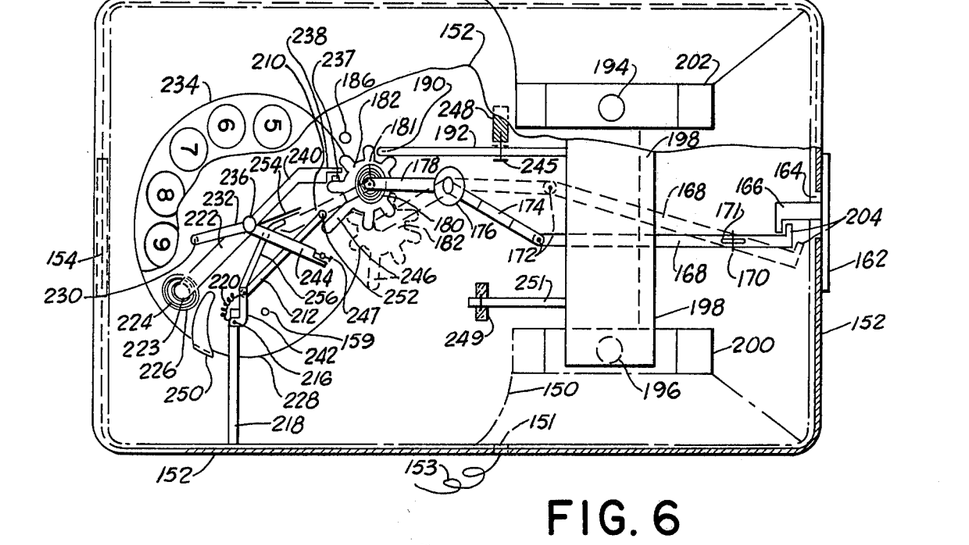
FIG. 6 is a plan view of FIG. 5 in partial cross-section.

Referring now to FIGS. 5 through 10 the construction and operation of the phone lock adapted for a conventional rotary dial phone will be described. A conventional phone 150 having a rotary dial will be seen to be fitted within a housing 152 fitting over the phone 150. A flap 154 is attached to the interior side of the front of the phone lock housing 152, and when a rear flap or door 162 pivotable on a hinge 160 is set into an upright position, the phone 150 is completely enclosed by the housing 152 of the phone lock. A slot 151 formed in the housing 152 permits a telephone cord 153 of the phone 150 to be extended in an outward direction from the phone lock; the cord 153 is attached to a conventional receiver-speaker 155 at its other end. A bottom end or door 158 of the phone lock is pivotably attached to a hinge 156 dispposed at the front end of the phone lock. A locking hook 166 is attached to the rear door 162, and the locking hook 166 may be pushed through an opening 164 in the housing 152 when the door 162 is in the upright position. Upon turning a key 177 disposed in a lock 176 of the phone lock clockwise, i.e. locking the phone 150 to the phone lock, an arm 174 rigidly attached to the lock 176 swings from a position shown dotted in FIG. 6, to a position displaced by about 30° therefrom and shown in full lines on FIG. 6. An arm 168 is pivotably attached to the arm 174 and is formed with a longitudinal slot 171. An arm 206 extending in a downward direction from the housing 152 has a pin 170 attached at the lower extremity thereof, the pin 170 passing through the slot 171 and serving to guide the arm 168. When the key 177 is turned clockwise, the arm 168 swings into a position engaged with the hook 166, as can be best seen in FIG. 6. The phone lock is then locked to the conventional rotary dial-type phone 150. The phone lock is formed with two pairs of upward projections 202, forming a cradle for the receiver-speaker 155, and a depressable push-button 194 is disposed midway between each pair of the projections 202. The depressible pushbuttons 194 are attached to a plate 198, normally in a horizontal position, and longitudinal arm or lever 192 projects from the plate 198 in an outward direction and to the left of the plate 198, as shown in FIGS. 5 and 6, the arm 192 being inclined downwardly subtending a small angle with the horizontal. An arm 178, spaced approximately 150° clockwise from the arm 174, is also rigidly attached to the lock 176. A vertically downwards pointing shaft 181 is rigidly attached to the other end of the arm 178 and a gear 182 formed with a plurality of fingers, one of the fingers being an elongated finger 246, is rotatably attached to the shaft 181. A torsion spring 180 is connected with its respective ends to the gear 182 and the shaft 181, so that when the spring 180 is wound, it urges the gear 182 to rotate in a clockwise direction. It should be noted that in the unlocked position the gear 182 occupies a position shown dotted in FIG. 6.

A dial disc 228 of the conventional rotary-dial phone 150 is connected through a knob 226 inserted into the zero digit opening of the dial disc 228, the latter being connected to a shaft 223, on an arm 222. The latter arm is, in turn, attached to a shaft 236, the shaft 236 being attached to the center of a new dial disc 234 of the phone lock. The shaft 223 is slidable within the arm 222 in a direction perpendicular to the plane of the arm 222 and is pushed in an outward direction therefrom by a compression spring 224 nestling between the knob 226 and the arm 222. Arms 240 and 244 are angularly offset from the arm 222, but not coplanar therewith. Arms 240 and 244 have ratchets affixed thereto at their respective outward extremities, the ratchet for the arm 240 being best illustrated in FIGS. 9 and 10. A pin 237 is attached to the arm 240 within a recess formed at an extremity thereof; a vertically downwards extending pin 238 is rotatable about a pivot 239 on the pin 237 in a clockwise direction only, as seen when viewing arm 240 from the right, its counterclockwise motion being limited by an endportion of the arm 240 acting as a stop. The ratchet in the arm 244 is mirrorsymmetrical with the ratchet of the arm 240.

When any digit from 1 through 9 is dialed in a clockwise direction, the arm 240, which is rigidly attached to the shaft 236, rotates the gear 182 counterclockwise by an angular distance equivalent to a spacing between adjacent fingers thereof by virtue of the bar 238, acting as a ratchet. The position of the gear 182 is maintained by a pin 190 attached to the bar 192, the pin 190 preventing any clockwise motion of the gear 182 urged to do so by the torsion spring 180. When any of the digits 1 through 9 is dialed, the arm 244, being rigid with the shaft 236 and coplanar with the arm 240, passes in a clockwise motion over a one-way stop 242 as a result of a pin 247 — best illustrated in FIG. 8 — pivoting during that motion from a vertical position to a horizontal position, as shown in the dotted position of the pin in FIG. 8. It should be noted that the pin 247 of the arm 244 is similar in its action, except for the mirror symmetry mentioned, to that of the pin 238 of the arm 240. The action of the phone lock is designed to permit dialing of the digit zero following an initial dialing of any digit from 1 through 9, and the construction of the phone lock and its method of operation to achieve this goal will be described in what follows.

Figures 7, 8, 10:
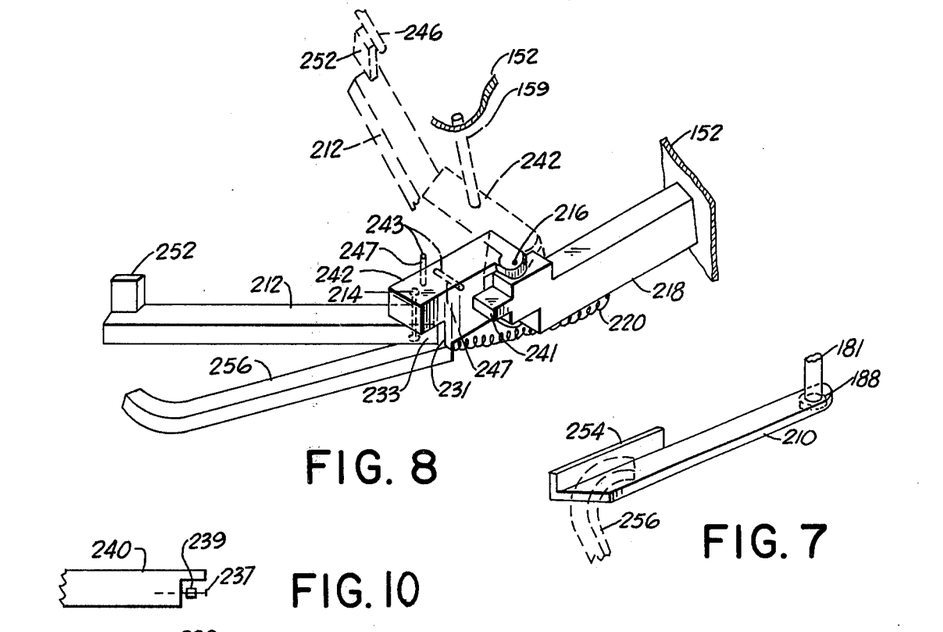
FIG. 7 is a perspective view of a portion of the resetting mechanism of the phone guard.
FIG. 8 is a perspective view of another portion of the resetting mechanism.
FIG. 10 is a plan view corresponding to FIG. 9.
Figure 9:
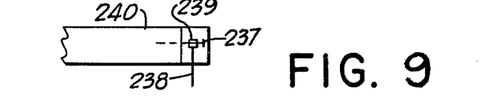
FIG. 9 is an elevation view of a detail of the ratchet of the phone guard.

On the return dial motion of the arm 244 the pin 247, acting as a ratchet and unable to execute a clockwise motion, as seen when viewing FIG. 6, moves the one-way stop 242 in a clockwise direction, until the latter hits a limit stop or bar 159, and then assumes the position shown dotted in FIG. 8, the one-way stop 242 being rotatable about a pivot 216, and connected to a normally horizontal bar 218 anchored in the frame 152. It should be noted that the one-way stop 242 is normally held in its extreme anticlockwise position abutting against an end-stop of the bar 218 by a tension spring 220, whose one end is attached to the bar 218, its other end being attached to an extremity of the end stop 242. The positioning of the one-way stop to its extreme clockwise position clears the way for the projection 230 formed on an arm 232 attached rigidly to the shaft 236 to pass over the position previously occupied by one-way stop 242 when in its former extreme anticlockwise position, so that the digit zero can now be dialed.

When the plurality of digits assigned to a local call, e.g. seven digits, have been dialed, the gear 182 has been rotated fully counterclockwise, so that an elongated finger 246 thereof strikes a stop bar 186 extending downwardly from the housing 152; thus additional digits can no longer be dialed, and long-distance calls, which require a number of digits exceeding the plurality of digits needed for local calls, cannot be made.

When the receiver-speaker 155 is now replaced on its cradle, e.g. on completion of a local call, the arm 192 will pivot vertically upwards, being rotatably attached to an arm 248 extending vertically downwards from a top portion of the housing 152 through a pivot 245. Pin 190, which has previously stopped the motion of the gear 182, is lifted in an upward direction by the bar 192, and the gear 182 is now free to rotate to its initial position in a clockwise direction, being urged to do so by the torsion spring 180.

It will now be necessary to reset all portions of the phone lock to the initial position. It should be noted that the mechanism illustrated in FIG. 8 includes an arm 256 offset at an angle from the arm 218, but rigidly attached to 242 and formed with a curved end. Also attached to the end portion of the one-way stop 242 and rotatable about a pivot 214 is an arm 212, formed with an upwardly pointing end projection 252 thereon. The initial position of gear 182 is reached when its elongated finger 246 strikes the projection 252 on arm 212, when the latter is caused to occupy an extreme anticlockwise position beyond which it cannot be turned by virtue of an endportion 233 of the bar 212 hitting a stop surface 231 of the one-way stop 242, taking along also and resetting in its motion the latter.

The phone lock can be unlocked to permit a user to dial long-distance calls by turning the key 177 counterclockwise in the lock 176. This motion of the key 177 will move the arm 178 counterclockwise to the position shown dotted in FIG. 6, carrying the gear 182 along with it. Thus the gear 182 will move clear of the ratchets 238 and 190. Simultaneously a bar 210 rigidly attached to the shaft 181 will rotate counterclockwise, so that a tab 254 projecting upwardly from the bar 210 will strike the curved end of the bar 256 as best seen in FIG. 7, and move the zero stop mechanism shown in FIG. 8 clear of a stop 230 projecting downwardly from the bar 232, the stop 230 acting as a zero dialing stop.

When the arm 212 occupies the position shown dotted in FIG. 8 and it is desired to reset the zero stop to the "lock" position, the key 177 is inserted into the lock 176 and turned clockwise. The consequent concurrent clockwise motion of the bar 178 rigidly attached to the lock 176 carries the gear 182 to the position shown in full lines in FIG. 6. The elongated finger 246 of the gear 182 then strikes the tab 252 on the bar 212, as best seen in FIG. 6, swinging the latter counterclockwise and carrying the one-way stop 242 along with it to the position shown in full lines in FIG. 8, which is the latters lock position.

Although the invention has been described with respect to a preferred version thereof, it is to be understood that it is not to be so limited since changes can be made therein which are within the full intended scope of the appended claims.

I claim:

1. A telephone lock attachable to a telephone, the telephone having first dialing means for dialing a multiplicity of digits and an operatively hand-held receiver and speaker placeable on a first set of depressable push-buttons, the lock permitting a user to dial local calls only, the local calls being dialable with a first predetermined number of digits, at least one of the digits being assigned for calling an operator, comprising:

a second set of depressable push-buttons for said receiver and speaker to rest upon and for making contact with the first set of push-buttons, respectively, when the receiver and speaker are inoperative;

second dialing means having an initial state connected to the first dialing means for enabling a user to dial a selected number of the digits sequentially upon the receiver and speaker having been lifted from said second set of push-buttons, said selected number being equal to the first number;

first dialing stop-means for preventing the user from dialing the at least one of the digits on said second dialing means for reaching the operator on at least an initial dialing;

second dialing stop-means for preventing the user from dialing an additional number of the digits upon the first number of digits having been dialed;

a housing;

counting means for counting the first number of digits, including a shaft, a gear rotatable on the latter and formed with a plurality of substantially equispaced longitudinal fingers, said plurality being numerically equal to said first number plus one, one of said fingers being an elongated finger exceeding the remaining fingers in length, and a torsion spring having two ends and being attached with one end thereof to said shaft and with the other end thereof to said gear for urging the latter to move in one direction, said gear being advanceable one angular step equal to the spacing between adjacent fingers upon the dialing of one of the digits, said torsion spring being stepwise windable by the dialing of said one of the digits, said second dialing stop-means including a bar attached to said housing for stopping the advancement of said gear upon said bar impinging on said elongated finger and upon said gear having been rotated by a plurality of steps numerically equal to said first number; and resetting means for resetting said second dialing means to said initial state upon the receiver and speaker having been replaced on said second set of push-buttons.

2. A telephone lock according to claim 1 wherein said counting means further includes ratchet means cooperating with said gear for preventing the latter from rotating in the direction urged by said torsion spring during digit dialing, said gear being displaceable by said resetting means from a position cooperating with said ratchet to a positon disengaged therefrom, whereby said torsion spring returns said gear to said initial state.

3. A telephone lock according to claim 2 further comprising lock means having locked and unlocked positions for locking and unlocking said housing to and from the telehone, respectively, and wherein long distance calls and local calls only are dialable from the lock-attached telephone in said unlocked and locked positions, respectively.

4. A telephone lock according to claim 3 wherein the operator is callable by initially dialing the digit zero and said operator-dialing stop means includes zero-dialing stop means having an initial position for preventing dialing of the digit zero on said initial dialing, and release means for setting said zero-dialing stop means to an inoperative position.

5. A telephone lock according to claim 4 wherein said resetting means includes means for resetting said zero-dialing stop means from said inoperative position to said initial position.

6. A telephone lock according to claim 5 wherein the telephone is a pushbutton telephone, wherein said second dialing means comprise a second set of pushbuttons, and said first dialing means comprises a first set of pushbuttons contactable by said second set of pushbuttons, respectively.

7. A telephone lock according to claim 5 wherein the telephone is a rotary-dial telephone, wherein said first and second dialing means comprises first and second dialing discs, respectively, the first dialing disc being actuable by said second dialing disc.

* * * * *

UNITED STATES PATENT OFFICE
CERTIFICATE OF CORRECTION

Patent No. 4,022,992      Dated May 10, 1977

Inventor(s) Austin R. Q. Kennedy

It is certified that error appears in the above-identified patent and that said Letters Patent are hereby corrected as shown below:

Item [76] in inventor's address change
"Sanford Station, 3751 W. 6th St., Los Angeles, Calif. 90005" to
-- 4532 W. 17th Street, Los Angeles, Calif. 90019 --.

In the Abstract:
    Line 23, change "means" to -- device --.

In the Claims:
    Claim 3, line 4, change "telehone" to -- telephone --
    Claim 4, line 3, change "operator-" to -- first --.

Signed and Sealed this

Twenty-eighth Day of February 1978

[SEAL]

*Attest:*

RUTH C. MASON      LUTRELLE F. PARKER
*Attesting Officer*      *Acting Commissioner of Patents and Trademarks*